US009785334B2

(12) United States Patent
Shieh et al.

(10) Patent No.: US 9,785,334 B2
(45) Date of Patent: Oct. 10, 2017

(54) METHOD FOR EDITING FRAME-BASED PAGE, ELECTRONIC APPARATUS AND RECORDING MEDIUM USING THE SAME

(71) Applicant: HTC Corporation, Taoyuan County (TW)

(72) Inventors: Chia-Chia Shieh, Taoyuan County (TW); Yen-Shun Wu, Taoyuan County (TW); Ting-An Yang, Taoyuan County (TW); Ju-Wei Huang, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 201 days.

(21) Appl. No.: 14/102,511

(22) Filed: Dec. 11, 2013

(65) Prior Publication Data
US 2014/0372925 A1 Dec. 18, 2014

Related U.S. Application Data

(60) Provisional application No. 61/834,881, filed on Jun. 14, 2013.

(51) Int. Cl.
*G06F 3/048* (2013.01)
*G06F 3/0486* (2013.01)
(Continued)

(52) U.S. Cl.
CPC .......... *G06F 3/0486* (2013.01); *G06F 3/0481* (2013.01); *G06F 3/0485* (2013.01);
(Continued)

(58) Field of Classification Search
CPC ....................................... G06F 3/048–3/04886
See application file for complete search history.

(56) References Cited

U.S. PATENT DOCUMENTS

| 5,712,995 A * | 1/1998 | Cohn ..................... G06F 3/0481 |
| | | 715/792 |
| 2008/0034318 A1* | 2/2008 | Louch ................... G06F 3/0486 |
| | | 715/781 |

(Continued)

FOREIGN PATENT DOCUMENTS

| CN | 102144210 | 8/2011 |
| CN | 102215290 | 10/2011 |

(Continued)

OTHER PUBLICATIONS

"Strategies for Playing Tetris", author unknown, published Aug. 2, 2011 (dated by document metadata). Retrieved from http://gwommy.tripod.com/tetris/strategy.html.*

(Continued)

*Primary Examiner* — Tuyetlien T Tran
*Assistant Examiner* — Patrick Ramsey
(74) *Attorney, Agent, or Firm* — Jianq Chyun IP Office

(57) ABSTRACT

A method for editing a frame-based page, an electronic apparatus and a recording medium using the same are provided. In the method, an item-based page including items respectively representing applications is displayed on a touch screen. A touch operation performed on an item is detected by using the touch screen. The item is dragged according to the touch operation. Whether the item is dragged to an action area of the item-based page is determined. The item is turned into a new frame displaying a content of the application represented by the item after the item is determined to be dragged to the action area of the item-based page. The frame displays a content of the application represented by the item.

12 Claims, 13 Drawing Sheets

(51) Int. Cl.
*G06F 3/0485* (2013.01)
*G06F 3/0484* (2013.01)
*G06F 3/0481* (2013.01)

(52) U.S. Cl.
CPC ...... *G06F 3/04817* (2013.01); *G06F 3/04847* (2013.01); *G06F 2203/04803* (2013.01)

(56) References Cited

U.S. PATENT DOCUMENTS

| | | | | |
|---|---|---|---|---|
| 2011/0164054 A1* | 7/2011 | Murakami | ............ | G06F 3/0481 345/635 |
| 2011/0244924 A1* | 10/2011 | Jung | ............ | G06F 3/0481 455/566 |
| 2012/0013540 A1* | 1/2012 | Hogan | ............ | G06F 3/04883 345/173 |
| 2013/0057588 A1* | 3/2013 | Leonard | ............ | G06F 3/0488 345/660 |
| 2013/0167080 A1* | 6/2013 | Ari | ............ | G06F 3/0481 715/801 |
| 2013/0187866 A1* | 7/2013 | Kim | ............ | G06F 3/0488 345/173 |
| 2014/0149932 A1* | 5/2014 | Wilder | ............ | G06F 3/04886 715/810 |
| 2014/0164966 A1* | 6/2014 | Kim | ............ | G06F 3/04886 715/769 |
| 2014/0164991 A1* | 6/2014 | Kim | ............ | G06F 3/0481 715/794 |
| 2014/0289660 A1* | 9/2014 | Min | ............ | G06F 3/04842 715/765 |

FOREIGN PATENT DOCUMENTS

| | | | | |
|---|---|---|---|---|
| CN | 102446059 | | 5/2012 | |
| KR | 10-2014-0073380 | * | 6/2014 | .......... G06F 3/0481 |
| KR | 1020140073371 | * | 6/2014 | |
| KR | 1020140115731 | * | 10/2014 | |
| WO | 2011127817 | | 10/2011 | |

OTHER PUBLICATIONS

Machine translation of Korean patent application publication KR 10-2014-0073380, 49 pages.*
"First Office Action of China Counterpart Application", issued on Nov. 23, 2016, p. 1-p. 11.

* cited by examiner

METHOD FOR EDITING FRAME-BASED PAGE, ELECTRONIC APPARATUS AND RECORDING MEDIUM USING THE SAME

CROSS-REFERENCE TO RELATED APPLICATION

This application claims the priority benefits of U.S. provisional application Ser. No. 61/834,881, filed on Jun. 14, 2013. The entirety of the above-mentioned patent applications is hereby incorporated by reference herein and made a part of this specification.

BACKGROUND

To fit today's busy life, different space-efficient and highly portable mobile devices are developed. Taking personal digital assistants (PDA), PDA phones, and smart phones as examples, they not only offer various functions as conventional communication devices do, but also allow the users to edit files, send/receive e-mails, browse web pages, and perform instant messaging through built-in operating system (OS).

As to a light, slim, and small portable electronic device, the volume thereof has to be very small, and the screen size thereof has to be reduced. To dispose a larger screen within a limited space, a touch screen has been developed recently, in which the screen is simultaneously served as a display unit and an input unit of a portable electronic apparatus, so that both the cost and the space for disposing a conventional keyboard are saved. The operation of the touch screen is very simple and straightforward. A user can perform various operations on the screen by simply touching the screen with a stylus or a finger.

Recently, a frame-based page including multiple frames for accommodating various application icons or widgets, such as tiles in Windows 7 mobile, is developed to help users to efficiently organize their desktop. However, when the user wants to add new frames to the frame-based page, the user has to enter a specific page listing all the items that could be turned into frames and added to the frame-based page. After the user chooses the desired item, a new frame representing the desired item would be subsequently added to the frame-based page. Therefore, it is inconvenient and not intuitive for the user to add new frames to the frame-based page.

SUMMARY

Accordingly, the present invention is directed to a method for editing a frame-based page, and an electronic apparatus and a recording medium using the same that could facilitate the user to add new frames to the frame-based page.

A method for editing a frame-based page is introduced herein. The method is adapted to an electronic apparatus having a touch screen. The method includes the following steps. An item-based page including one or more items respectively representing one or more applications is displayed on the touch screen. A touch operation performed an item by using the touch screen is detected. The item is dragged according to the touch operation. Whether the item is dragged to an action area of the item-based page is determined. The item-based page is turned into a frame displaying a content of the application represented by the item after it is determined the item is dragged to the action area of the item-based page. The frame displays a content of the application represented by the item.

An electronic apparatus is introduced herein. The apparatus includes a touch screen, a storage unit and one or a plurality of processing units. The storage unit stores a plurality of modules. The processing units are coupled to the touch screen and the storage unit. The processing units execute the modules recorded in the storage unit to cause the electronic apparatus to display an item-based page including one or more items respectively representing one or more applications on the touch screen, to detect a touch operation performed on an item by using the touch screen, to drag the item according to the touch operation, to determine whether the item is dragged to an action area of the item-based page, to turn the item into a frame displaying a content of the application represented by the item after the item is determined to be dragged to the action area of the item-based page. The frame displays a content of the application represented by the item.

A recording medium is introduced herein. The recording medium stores a computer program and the computer program is loaded into an electronic apparatus to execute following steps: displaying an item-based page including one or more items respectively representing one or more applications on a touch screen; detecting a touch operation performed on an item by using the touch screen; dragging the item according to the touch operation; determining whether the item is dragged to an action area of the item-based page; turning the item into a frame displaying a content of the application represented by the item after it is determined the item is dragged to the action area of the item-based page. The frame displays a content of the application represented by the item.

Based on the above description, the examples of the present invention provide a method for editing a frame-based page, and an electronic apparatus and a recording medium using the same. In the present application, when the user drags an item in an item-based page to an action area, the electronic apparatus may correspondingly turn the item into a new frame and switching the displayed content to the frame-based page. The frames in the frame-based page overlaid with the new frame are correspondingly moved while the user moves the new frame in the frame-based page, such that the user may have a novel user experience in editing the frame-based page.

In order to make the aforementioned and other features and advantages of the invention comprehensible, several exemplary examples accompanied with figures are described in detail below.

BRIEF DESCRIPTION OF THE DRAWINGS

The accompanying drawings are included to provide a further understanding of the invention, and are incorporated in and constitute a part of this specification. The drawings illustrate examples of the invention and, together with the description, serve to explain the principles of the invention.

DETAILED DESCRIPTION OF DISCLOSED EXAMPLES

Figure 1:
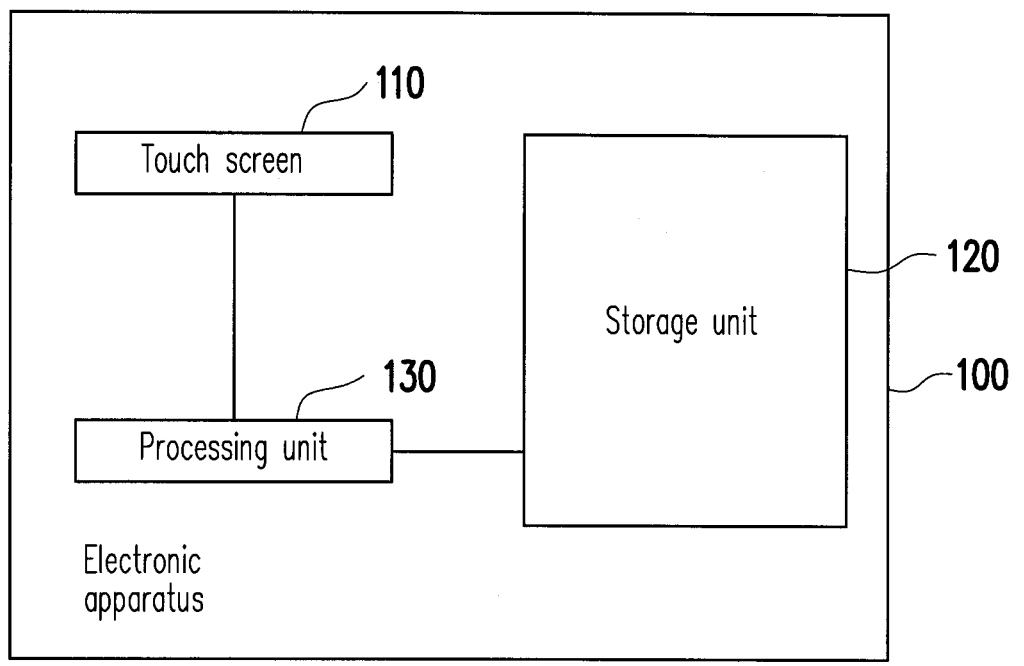
FIG. 1 is a block diagram illustrating an electronic apparatus according to an exemplary example of the present application.

Some examples of the present application will now be described more fully hereinafter with reference to the accompanying drawings, in which some, but not all examples of the application are shown. Indeed, various examples of the application may be embodied in many different forms and should not be construed as limited to the examples set forth herein; rather, these examples are provided so that this disclosure will satisfy applicable legal requirements. Like reference numerals refer to like elements throughout.

FIG. 1 is a block diagram illustrating an electronic apparatus according to an exemplary example of the present application. In the present example, the electronic apparatus 100 includes a touch screen 110, a storage unit 120 and a processing unit 130. Please note that the number of the processing unit is not limited to one in the present application. The electronic apparatus 100 may be a cell phone, a smart phone, a personal digital assistant (PDA), a PDA phone, a laptop, or a tablet computer.

The touch screen 110 is fabricated by integrating resistive, capacitive, or any other type of touch sensing devices with a liquid crystal display (LCD), and which can detect the touch operations performed by a user at the same time when displaying frames of the electronic apparatus 100. The storage unit 120 is one or a combination of a stationary or mobile random access memory (RAM), read-only memory (ROM), flash memory, hard disk, or any other similar device, and which records a plurality of modules that can be executed by the processing unit 130. These modules can be loaded into the processing unit 130 to perform a method for editing a frame-based page.

The processing unit 130 includes one or a combination of a central processing unit (CPU), a programmable general- or specific-purpose microprocessor, a digital signal processor (DSP), a programmable controller, application specific integrated circuits (ASIC), a programmable logic device (PLD), or any other similar device. The processing unit 130 is coupled to the touch screen 110 and the storage unit 120. The processing unit 130 accesses and executes the modules recorded in the storage unit 120 to perform the method for editing the frame-based page.

The modules stored in the storage unit 120 may include a display module, a detecting module, an operating module, a determination module and a turning module. These modules may be computer programs which can be loaded into the processing unit 130 to perform the method for editing the frame-based page. Further, although the modules are described as separate components, the modules could also be implemented as a single component for efficiency or convenience. Below, how the electronic apparatus 100 performs the method for editing the frame-based page is described in detail with reference to examples of the present application.

Figure 2:
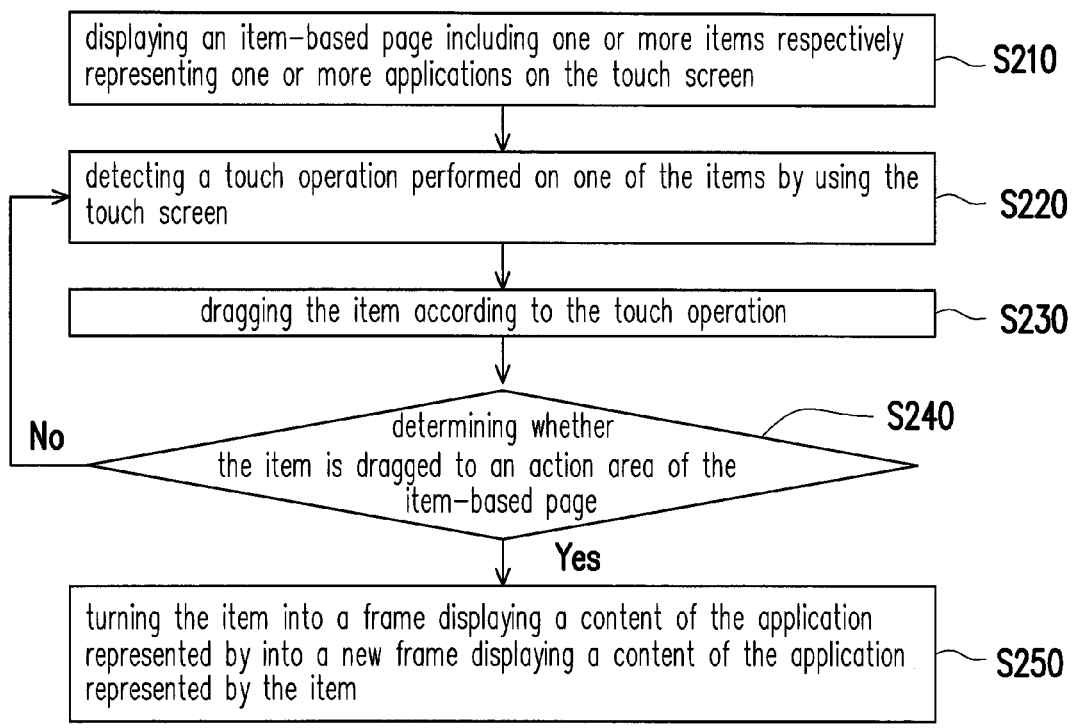
FIG. 2 is a flow chart illustrating the method for editing the frame-based page according to an exemplary example of the present application.

FIG. 2 is a flow chart illustrating the method for editing the frame-based page according to an exemplary example of the present application. The method for editing the frame-based page in the present example is suitable for the electronic apparatus 100 illustrated in FIG. 1. Below, the method for editing the frame-based page is described in detail with reference to various components of the electronic apparatus 100.

In step S210, the display module is executed by the processing unit 130 to cause the electronic apparatus 100 to display an item-based page including one or more items respectively representing one or more applications on the touch screen 110. The items may be the icons of the applications. In some examples, all of the applications installed in the electronic apparatus 100 may be listed in a series of consecutive item-based pages, but the application is not limited thereto.

In step S220, the detecting module is executed by the processing unit 130 to cause the electronic apparatus 100 to detect a touch operation performed on an item by using the touch screen 110. In step S230, the operating module is executed by the processing unit 130 to cause the electronic apparatus 100 to drag the item according to the touch operation. In some examples, the determination module is executed by the processing unit 130 to cause the electronic apparatus 100 to determine whether the time that the touch operation stays on the touched item is over a threshold (e.g., 0.5 second). In some examples, some other factors may be incorporated as the basis to determine whether to drag the item, and the present example is not limited thereto. If yes, the electronic apparatus 100 may accordingly perform the behaviours described in step S230. In some examples, the display module may be executed by the processing unit 130 to cause the electronic apparatus 100 to lift the item from the item-based page. That is, the electronic apparatus 100 may slightly enlarge the item and/or move the item slightly upward so to inform the user of the selection on the item. Further, the display module may be executed by the processing unit 130 to cause the electronic apparatus 100 to move the item along with a moving path of the touch operation. On the other hand, when the time that the touch operation stays on the touched item is shorter than the threshold, the processing unit 130 may activate the application corresponding to the touched item, but the application is not limited thereto.

In addition, the display module may be executed by the processing unit 130 to cause the electronic apparatus 100 to further display an action area on the item-based page after the time that the touch operation stays on the touched item is determined to be over the threshold. In some examples, the action area may be designed as one or a combination of a left side area, a right side area, a top side area, a bottom side area of the item-based page. Besides, the action area may have a predetermined width to the edge of the item-based page.

In step S240, the determination module is executed by the processing unit 130 to cause the electronic apparatus 100 to determine whether the item is dragged to the action area of the item-based page. If yes, the turning module is executed by the processing unit 130 to cause the electronic apparatus 100 to subsequently perform step S250; if no, the flow is returned to step S220 for the electronic apparatus 100 to keep detecting the touch operation.

In step S250, the turning module is executed by the processing unit 130 to cause the electronic apparatus 100 to turn the item into a new frame displaying a content of the application represented by the item. The content displayed in the new frame may be some information that could be shown after the application is normally accessed. For example, if the application is a news application that could show the news after being activated, the content in the new frame could directly show the latest news. In some examples, the new frame could be a widget of the application that shows the information provided by the application and some functional tools provided by the application.

In some examples, the determination module may be executed by the processing unit 130 to cause the electronic apparatus 100 to further determine whether the item overlays the action area for a predetermined time (e.g., 0.5 second) in step S230. If yes, the turning module may be executed by the processing unit 130 to cause the electronic apparatus 100 to accordingly turn the item into the new frame in step S240.

In some examples, the storage unit 120 could further include an editing module and a rearranging module. The editing module could be executed by the processing unit 130 to cause the electronic apparatus 100 to insert the new frame into an empty grid in a frame-based page in response to the touch operation being released. The grid where new frame is inserted is determined according to the location where the touch operation is released, or determined according to the location of the new frame when the touch operation is released. It is noted that the electronic apparatus 100 may move one or more frames overlaid with the new frame and the frames under the overlaid frames downward so as to empty a grid for accommodating the new frame after the new frame being dragged is determined to be overlaid with one of the frames of the frame-based page. After the new frame is inserted, the rearranging module may be executed by the processing unit 130 to cause the electronic apparatus 100 to rearrange the overlaid frames and the frames under the overlaid frames to fill the emptied grids based on some reflow rules, which would be described later.

The behaviors, which correspond to steps S210-S250, shown on the touch screen 110 would be easier to be understood with the schematic diagrams shown in FIG. 3A-3F. FIG. 3A to FIG. 3F are schematic diagrams illustrating the behaviors corresponding to the method for editing the frame-based page according to an exemplary example of the present application. In the present example, the electronic apparatus 100 is assumed to be a smartphone.

Figure 3A:
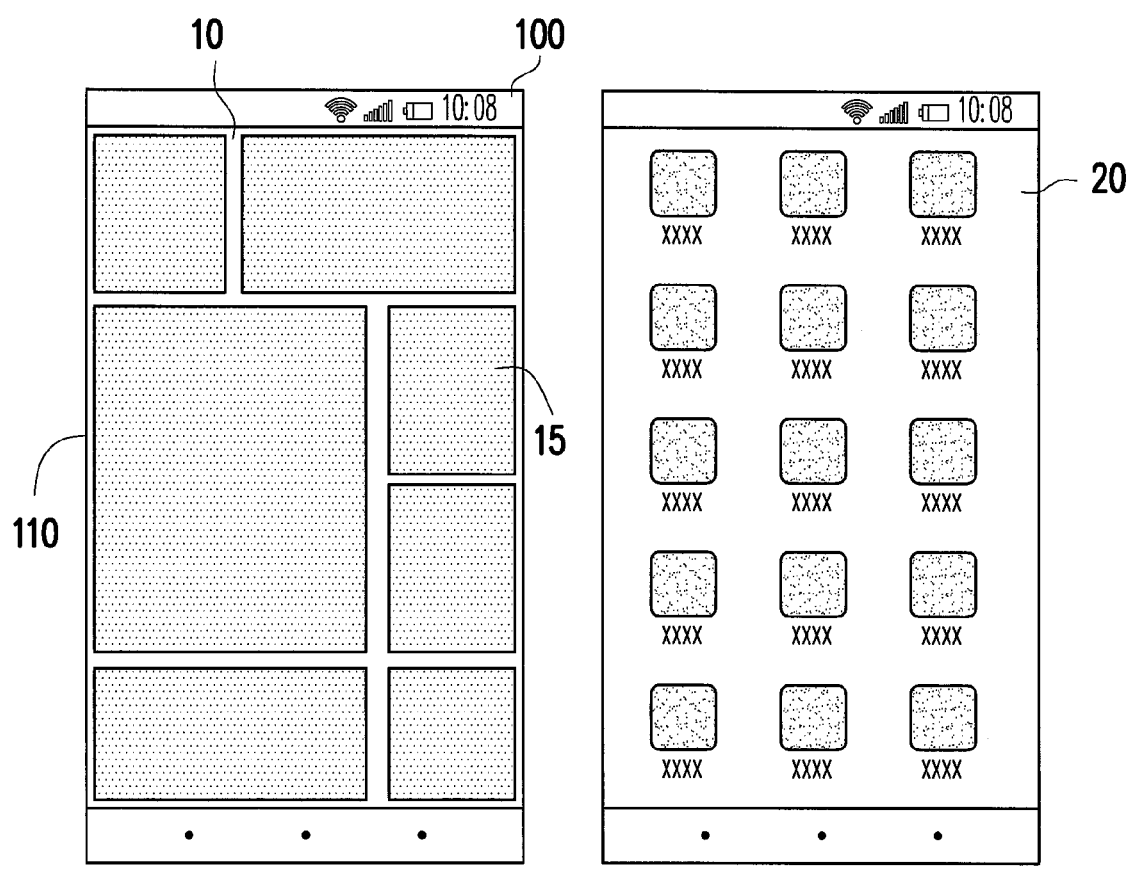
FIG. 3A to FIG. 3F are schematic diagrams illustrating the behaviors corresponding to the method for editing the frame-based page according to an exemplary example of the present application.

Referring to FIG. 3A, a frame-based page 10 shown on the touch screen 110 could be the home page of the electronic apparatus 100. The frame-based page 10 could include several frames corresponding to various applications. As mentioned in the previous examples, the frames (e.g., a frame 15) could directly show the information related to their corresponding applications, such as news, weathers, traffic conditions, or stock information, but the present application is not limited thereto.

In the present example, the user may perform a touch operation on the frame-based page 10 and slide to the left to switch the frame-based page 10 to an item-based page 20, which includes various items (e.g., the icons) of the applications currently installed in the electronic apparatus 100.

Figure 3B:
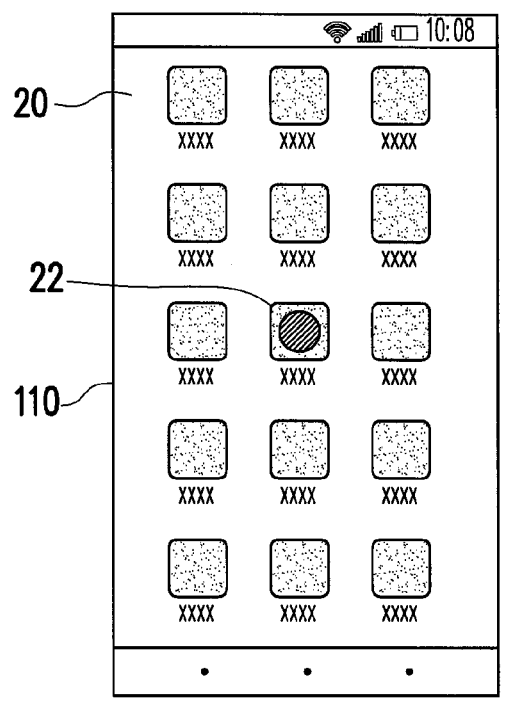
Figure 3C:
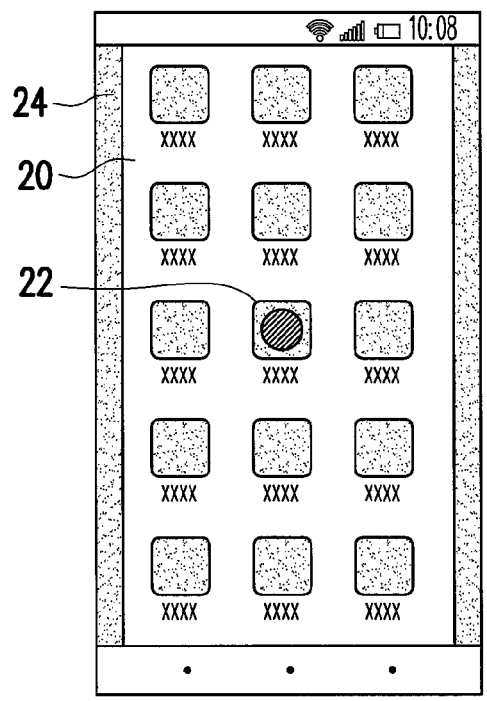
Figure 3D:
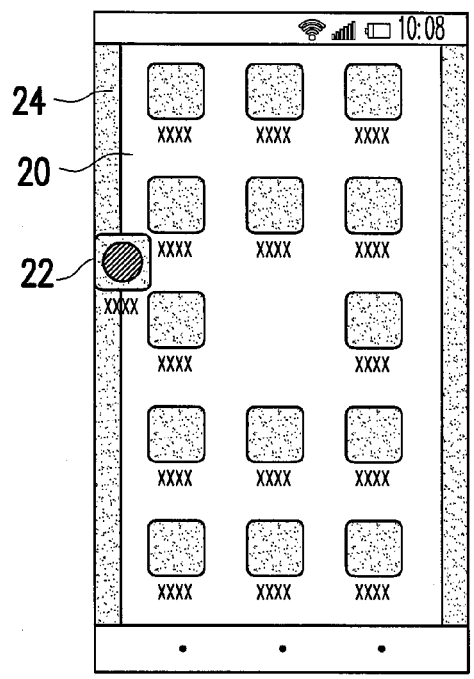

Referring to FIG. 3B, when the user wants to add a new frame related to an item 22 to the frame-based page 10, the user may perform a touch operation (represented by a black dot) on the item 22 in the item-based page 20, and the electronic apparatus 100 may correspondingly drag the item 22 according to the touch operation as shown in FIG. 3C. Referring to FIG. 3C, while the item 22 is being dragged, the electronic apparatus 100 may display an action area 24. Next, the user may move the item 22 toward the action area 24 as shown in FIG. 3D. After the electronic apparatus 100 determines that the item 22 has been dragged to the action area 24, the electronic apparatus 100 may correspondingly transfer the item-based page 20 to the frame-based page 10 and turn the item 22 into a new frame 14 as shown in FIG. 3E.

Figure 3E:
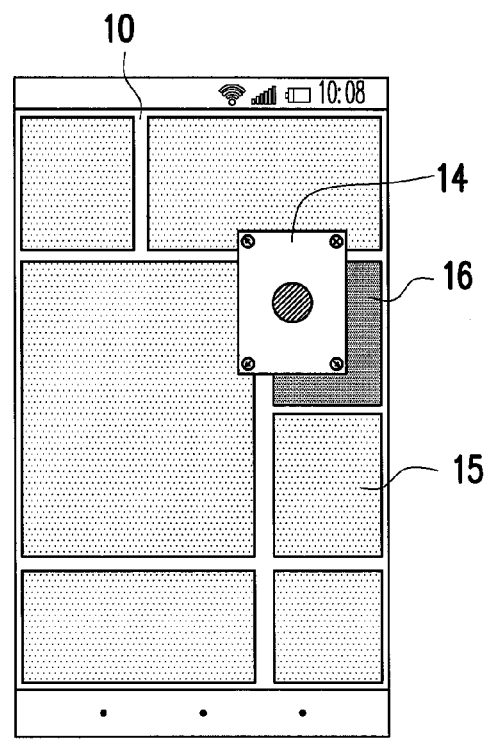
Figure 3F:
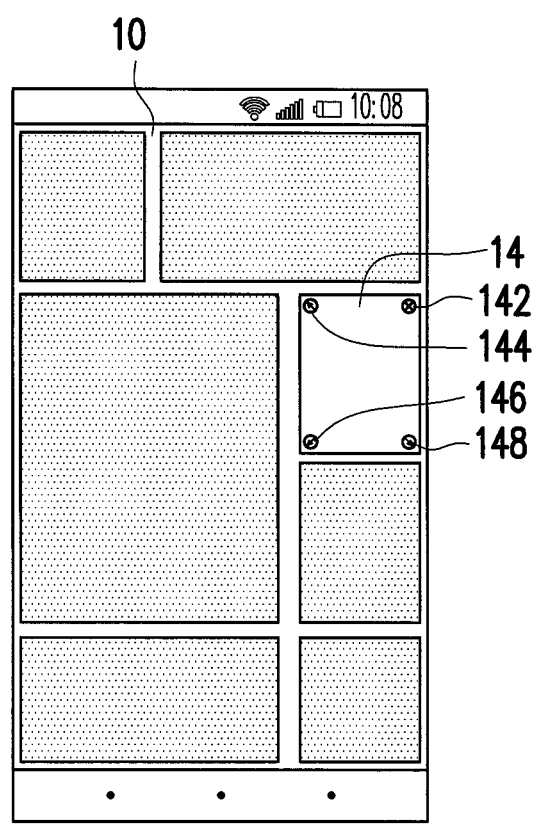

In FIG. 3E, the user may move the new frame 14 to any desired location within the frame-based page 10, and the electronic apparatus 100 would insert the new frame 14 into the selected location of the frame-based page 10. In some examples, the electronic apparatus 100 would arrange the frames within the frame-based page 10 to empty a grid where the new frame 14 could be inserted. For example, when the user moves the new frame 14 as shown in FIG. 3E, the electronic apparatus 100 may determine that the new frame 14 is overlaid with the frame 15. Next, the electronic apparatus 100 may, for example, move the overlaid frame 15 and the frames under the overlaid frame 15 downward to empty a grid 16. Afterwards, when the user releases the touch operation, the electronic apparatus 100 may insert the new frame 14 into the grid 16 as shown in FIG. 3F. In some examples, the new frame 14 could be designed with buttons 142, 144, 146 and 148, which may respectively locate at one of the corners of the new frame 14. The button 142 could be used to delete the new frame 14, and the buttons 144, 146 and 148 could be used to resize the new frame 14. Specifically, when the user performs a touch operation to one of the buttons 144, 146 and 148, the user may subsequently drag the buttons 144, 146 and 148 to switch the size of the new frame 14 to other sizes.

It should be noted that the ways that the electronic apparatus 100 moves the frames illustrated in FIG. 3E and FIG. 3F are just simple examples of the present application. In some other examples, the electronic apparatus 100 may move the overlaid frame and the frames under the overlaid frame in various ways. Besides, the ways that the electronic apparatus 100 moves back the moved frames may also be implemented according to some reflow rules.

Figure 4A:
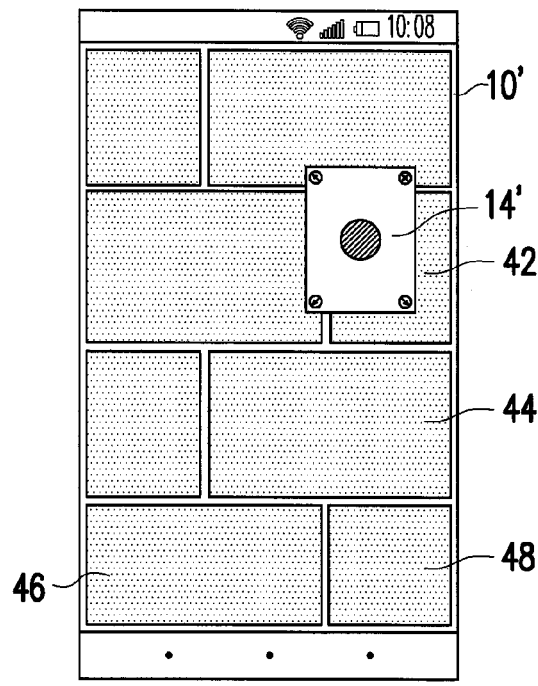
FIG. 4A to FIG. 4C are schematic diagrams illustrating one of the ways that the editing module moves the frames according to an exemplary example of the present application.
Figure 4B:
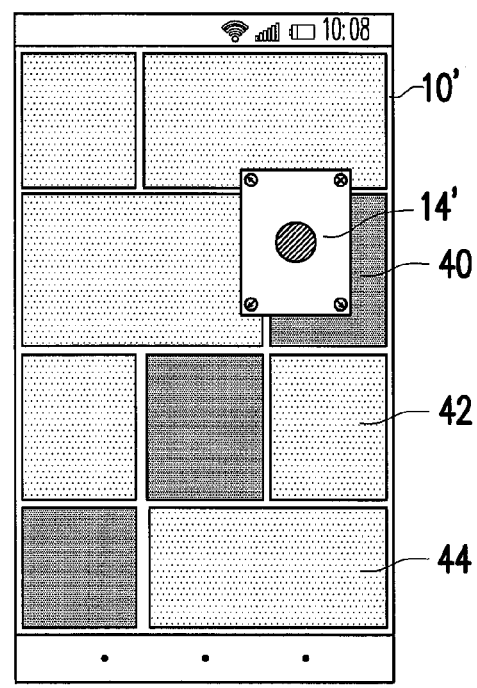
Figure 4C:
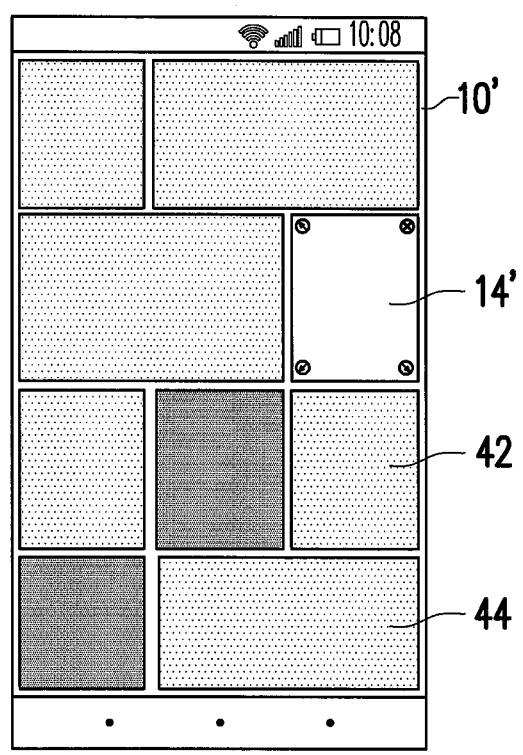

Taking FIG. 4A to FIG. 4C as examples, FIG. 4A to FIG. 4C are schematic diagrams illustrating the movement of the frames overlaid with a new frame according to an exemplary example of the present application. Referring to FIG. 4A, when the electronic apparatus 100 drags a new frame 14' to the location shown in FIG. 4A in response to the touch operation, the electronic apparatus 100 may move a frame 42 overlaid with the new frame 14' downward. Meanwhile, the electronic apparatus 100 may also move a frame 44, which is under the frame 42, downward. When the frame 44 is moved downward, frames 46 and 48 under the frame 44 may be moved downward as well. As a result, the electronic apparatus 100 may generate an empty grid 40 in the frame-based page 10'. Next, when the user releases the touch operation, the electronic apparatus 100 may correspondingly insert the new frame 14' into the empty grid 40.

It could be observed that there still exists some empty grids in FIG. 4C, and in other examples, the rearranging module could be executed by the processing unit 130 to cause the electronic apparatus 100 to fill the empty grids with the previously moved frames according to some reflow rules. In the following, examples are given to describe how the electronic apparatus 100 fills the empty grids.

Figure 5A:
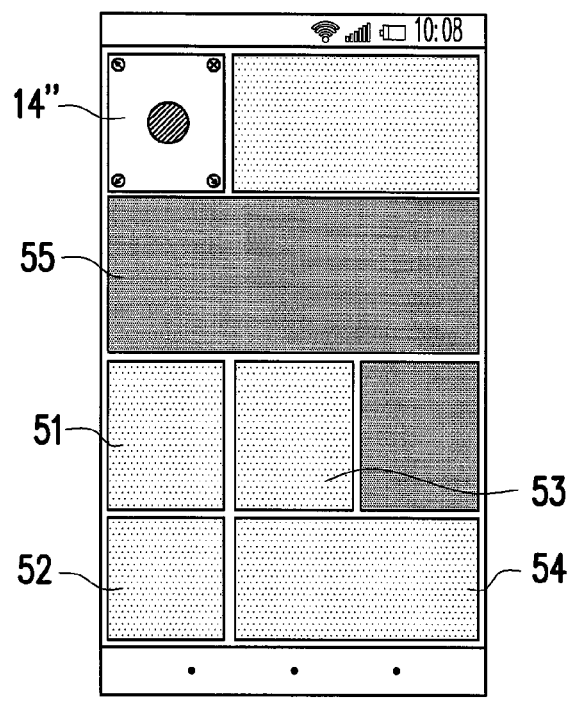
FIG. 5A and FIG. 5B are schematic diagrams illustrating reflow rules for filling empty grids with frames according to exemplary examples of the present application.
Figure 5B:
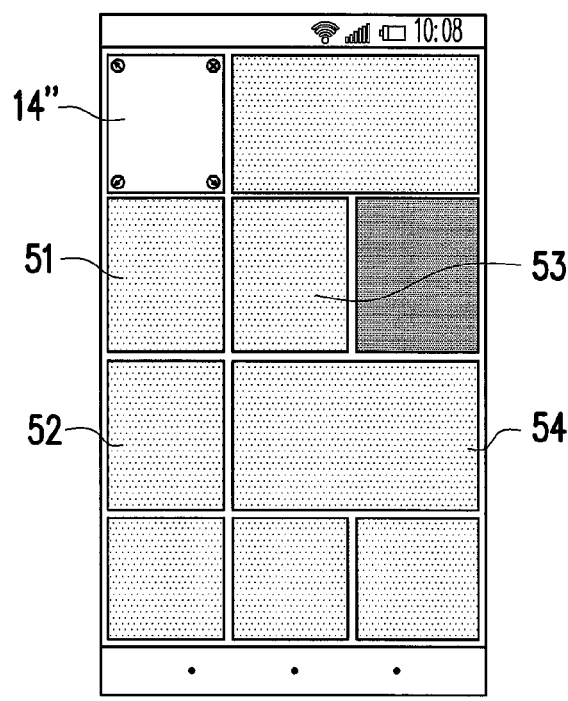

FIG. 5A and FIG. 5B are schematic diagrams illustrating reflow rules for filling empty grids with frames according to exemplary examples of the present application. Referring to FIG. 5A, it assumed that frames 51-54 are moved downward to the locations shown in FIG. 5A during the operation that the electronic apparatus 100 inserting a new frame 14". Since the grids 55 are emptied in a row, the rearranging module may be executed by the processing unit 130 to cause the electronic apparatus 100 to directly move the frames 51-54 upward to fill the empty grids 55 as shown in FIG. 5B.

Figure 6A:
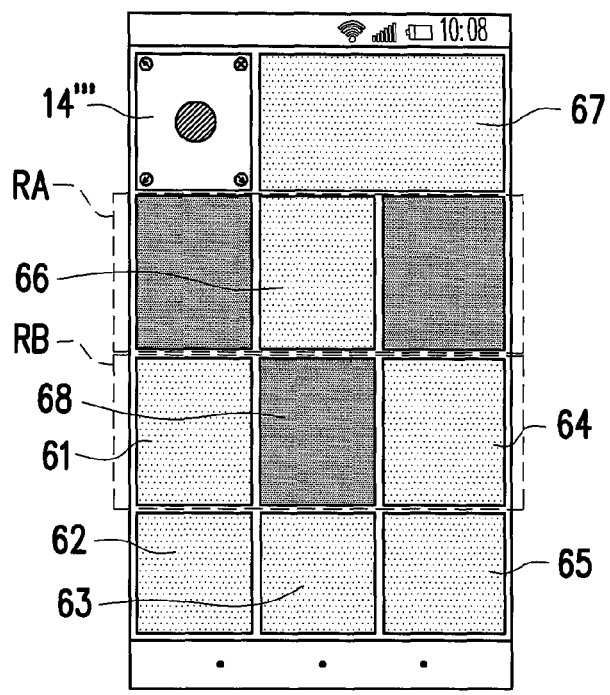
FIG. 6A and FIG. 6B are schematic diagrams illustrating reflow rules for filling empty grids with frames according to exemplary examples of the present application.
Figure 6B:
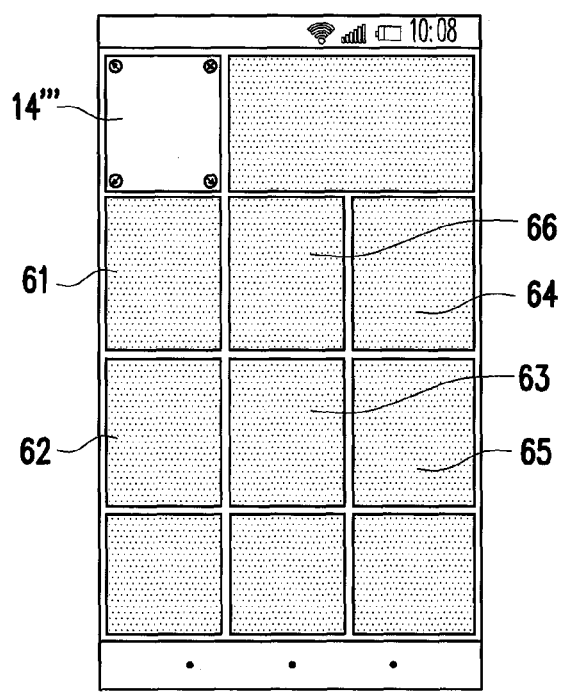

FIG. 6A and FIG. 6B are schematic diagrams illustrating reflow rules for filling empty grids with frames according to exemplary examples of the present application. Referring to FIG. 6A, it is assumed that frames 61-65 are formed after the frames overlaid with the new frame 14" are moved downward during the operation that the electronic apparatus 100 inserting the new frame 14". It could be observed that an upper row RB of the frames 61-65 and a lower row RA of the frames 66 and 67 above the frames 61-65 are opposite to each other. That is, the shapes of the upper row RB and the lower row RA are complementary to each other, such that when the upper row RB and the lower row RA are assembled, the resulted pattern would be a complete rectangle, but the present application is not limited thereto. When the upper row RB and the lower row RA are determined to be opposite to each other, the rearranging module may be executed by the processing unit 130 to cause the electronic apparatus 100 to directly move the frames 61-65 upward to fill the emptied grids as shown in FIG. 6B.

In some examples, when the user performs the touch operation to resize the frames of the frame-based page 10 to a smaller size, some empty grids may be correspondingly created. Under this situation, the rearranging module may also be executed by the processing unit 130 to cause the electronic apparatus 100 to move the frames under the empty grids to fill the empty grids.

Figure 7A:
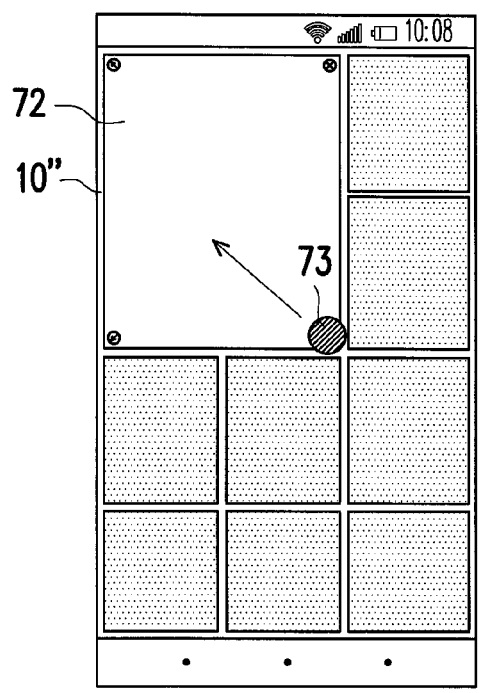
FIG. 7A to FIG. 7C are schematic diagrams illustrating reflow rules for filling empty grids with frames according to exemplary examples of the present application.
Figure 7B:
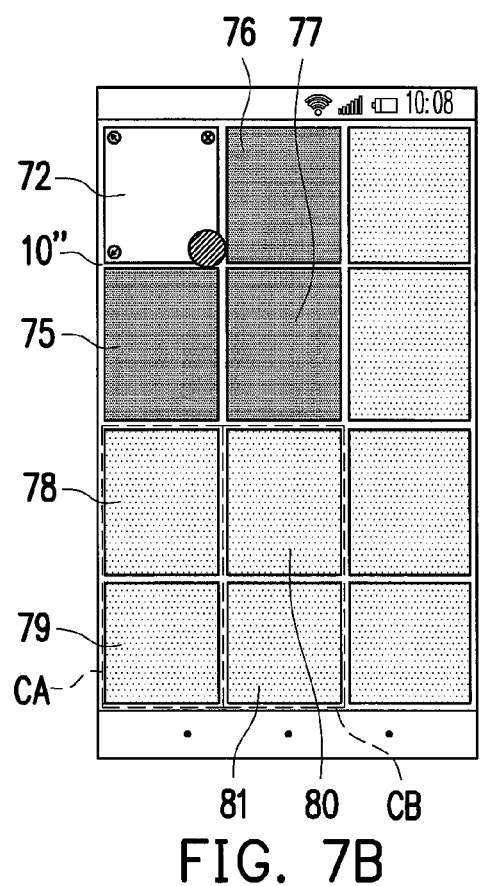
Figure 7C:
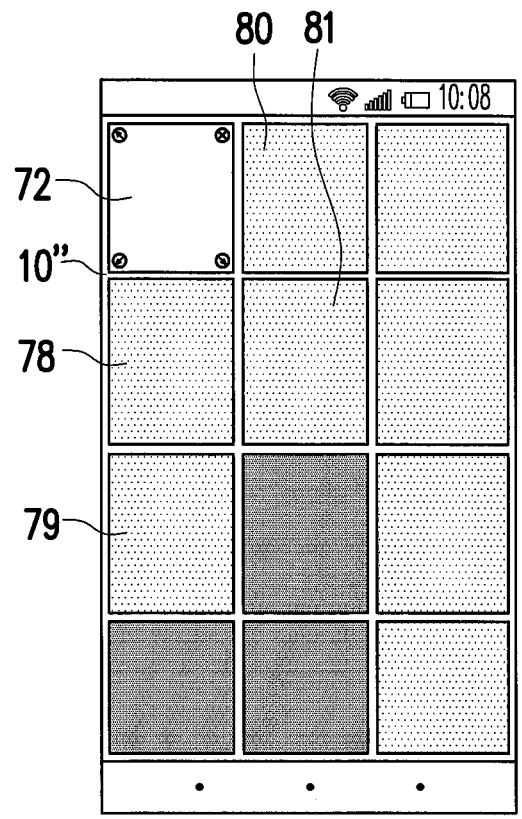

Taking FIG. 7A to FIG. 7C as examples, FIG. 7A to FIG. 7C are schematic diagrams illustrating reflow rules for filling empty grids with frames according to exemplary examples of the present application.

Referring to FIG. 7A, when the user resizes a frame 72 to a smaller size by performing the touch operation on a resize button 73 of the frame 72, the editing module may be executed by the processing unit 130 to cause the electronic apparatus 100 to correspondingly resize the frame 72 to be the size as exemplarily shown in FIG. 7B. Referring to FIG. 7B, since the size of the frame 72 become smaller, some empty grids (e.g., empty grids 75-77) may be generated. In the present example, the rearranging module may be executed by the processing unit 130 to cause the electronic apparatus 100 to move the frames under the grids emptied due to the resize of the frame 72 upward by columns to fill the emptied grids. Specifically, the electronic apparatus 100 may move a column CA (including frames 78 and 79) upward to fill the empty grid 75. The electronic apparatus 100 may also move a column CB (including frames 80 and 81) upward to fill the empty grids 76 and 77. The resulted arrangement of the frames included in the frame-based page 10" could be referred to FIG. 7C.

Figure 8:
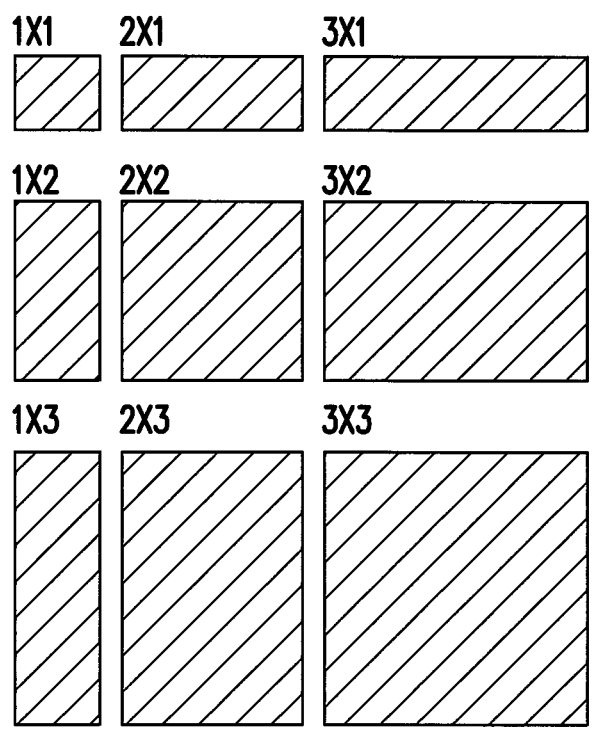
FIG. 8 is a schematic diagram illustrating the sizes to which a frame could be adjusted.

FIG. 8 is a schematic diagram illustrating the sizes to which a frame could be adjusted. In the present example, the size of a frame may include 1×1, 1×2, 1×3, 2×1, 2×2, 2×3, 3×1, 3×2, and 3×3 of a unit size as shown in FIG. 8. The unit size may be regarded as a size having one third width and one fourth height of the touch screen, but the present application is not limited thereto.

To sum up, the examples of the present invention provide a method for editing a frame-based page, an electronic apparatus and a recording medium using the same. In the present application, when the user wants to add a new frame to the frame-based page, the user may simply drag the related item in the item-based page to an action area of the item-based page, so as to transfer the item-based page to the frame-based page and turn the item into a new frame, such that the user may drag the new frame among the frame-based page and insert the same in an empty grid of the frame-based page. Along with the movement of the new frame, the frames overlaid with the new frame are moved to make the user clearly see the layout of the frame-based page after inserting the new frame. Besides, after the new frame is inserted, the previously moved frames are moved to fill the empty grids generated due to the insertion of the new frame according to several reflow rules. As a result, the examples of the present application provide the user with a novel, intuitive and easy operating experiences for editing the frame-based page.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A method for editing a frame-based page, adapt an electronic apparatus having a touch screen, the method comprising:

displaying an item-based page comprising one or more items representing one or more applications on the touch screen;

detecting a touch operation performed on an item by using the touch screen;

dragging the item according to the touch operation and displaying an action of the item-based page on an edge of the touch screen while the item is dragged;

determining whether the item is dragged to the action area of the item-based page and overlays the action area for a predetermined time;

in response to determining the item is dragged to the action area of the item-based page and overlays the action area for the predetermined time, turning the item into a frame and switching the item-based page to the frame-based page for allowing a user to move the frame to a desired location within the frame-based page, wherein the frame displays a content of the application represented by the item, the frame-based page comprises a plurality of specific frames and the specific frames do not overlap with each other, and the item-based page comprises no frame;

determining whether the frame overlays an original frame in the frame-based page;

moving the original frame in the frame-based page in response to determining the frame overlays the original frame in the frame-based page;

inserting the frame into the frame-based page in response to the touch operation being released; and rearranging the at least one overlaid original frame and at least one first frame under the at least one overlaid original frame to fill at least one grid emptied by moving the at least one overlaid original frame and the at least one first frame under the at least one overlaid original frame downward, wherein the rearranging comprises:

determining whether a first row containing the at least one overlaid original frame and a second row containing at least one second frame are opposite to each other and have complementary shapes, and directly moving the at least one overlaid original frame and the at least one first frame under the at least one overlaid original frame to fill the at least one emptied grid in response to determining the first row and the second row are opposite to each other and have complementary shapes.

2. The method for editing the frame-based page according to claim 1 further comprising:

determining whether a time of the touch operation staying on the item is over a threshold; and starting displaying the action area in response to determining the time of the touch operation stayed on the item is over the threshold.

3. The method for editing the frame-based page according to claim 2 further comprising:

lifting the item from the item-based page in response to determining the time of the touch operation staying on the item is over the threshold.

4. The method for editing the frame-based page according to claim 1, further comprising:

determining whether the at least one grid above the at least one overlaid original frame and the at least one first frame under the at least one overlaid original frame are emptied in a row, and directly move the at least one overlaid original frame and the at least one first frame under the at least one original overlaid frame upward to fill the at least one emptied grid in response to determining the at least one grid above the at least one overlaid original frame and the at least one first frame under the at least one original overlaid frame are emptied in a row.

5. An electronic apparatus, including:

a touch screen; and a memory device, storing a plurality of modules; and one or a plurality of processors, coupled to the touch screen and the memory device, executing the modules stored in the memory device to cause the electronic apparatus to:

display an item-based page comprising one or more items representing one or more applications on the touch screen;

detect a touch operation performed on an item by using the touch screen;

drag the item according to the touch operation and display an action area of the item-based page on an edge of the touch screen while the item is dragged;

determine whether the item is dragged to the action area of the item-based page and overlays the action area for a predetermined time;

in response to determining the item is dragged to the action area of the item-based page and overlays the action area for the predetermined time, turn the item into a frame and switch the item-based page to the frame-based page for allowing a user to move the frame to a desired location within the frame-based page, wherein the frame displays a content of the application represented by the item, the frame-based page comprises a plurality of specific frames and the specific frames do not overlap with each other, and the item-based page comprises no frame;

determine whether the frame overlays at least one original frame in the frame-based page;

move the at least one overlaid original frame in the frame-based page and at least one first frame under the at least one overlaid original frame downward in response to determining the frame overlays the at least one original frame in the frame-based page;

insert the frame into the frame-based page in response to the touch operation being released; and rearrange the at least one overlaid original frame and the at least one first frame under the at least one overlaid original frame to fill at least one grid emptied by moving the at least one overlaid original frame and the at least one first frame under the at least one overlaid original frame downward, wherein the rearranging comprises:

determine whether a first row containing the at least one overlaid original frame and a second row containing at least one second frame are opposite to each other and have complementary shapes, and directly moving the at least one overlaid original frame and the at least one first frame under the at least one overlaid original frame to fill the at least one emptied grid in response to determining the first row and the second row are opposite to each other and have complementary shapes.

6. The electronic apparatus according to claim 5, wherein the one or more processors executing the modules stored in the memory device to cause the electronic apparatus to:

determine whether a time of the touch operation staying on the item is over a threshold; and start displaying the action area in response to determining the time of the touch operation stayed on the item is over the threshold.

7. The electronic apparatus according to claim 6, wherein the one or more processors executing the modules stored in the memory device to cause the electronic apparatus to:

lift the item from the item-based page in response to determining the time of the touch operation staying on the item is over the threshold.

8. The electronic apparatus according to claim 5, wherein the one or more processors executing the modules stored in the memory device to cause the electronic apparatus to:

determine whether the frame overlays at least one original frame in the frame-based page; and move the at least one original frame in the frame-based page in response to determining the frame overlays the at least one original frame in the frame-based page.

9. The electronic apparatus according to claim 8, wherein the one or more processors executing the modules stored in the memory device to cause the electronic apparatus to:

rearrange the at least one overlaid original frame and at least one first frame under the at least one overlaid original frame to fill at least one grid emptied by moving the at least one overlaid original frame and the at least one first frame under the at least one overlaid original frame downward.

10. The electronic apparatus according to claim 9, wherein the one or more processors executing the modules stored in the memory device to cause the electronic apparatus to:

determine whether the at least one grid above the at least one overlaid original frame and the at least one first frame under the at least one overlaid original frame are emptied in a row, and directly move the at least one overlaid original frame and the at least one first frame under the at least one original overlaid frame upward to fill the at least one emptied grid in response to determining the at least one grid above the at least one overlaid original frame and the at least one first frame under the at least one original overlaid frame are emptied in a row.

11. The electronic apparatus according to claim 9, wherein the one or more processors executing the modules stored in the memory device to cause the electronic apparatus to:
  determine whether an upper row of the at least one overlaid original frame and a lower row of at least one second frame above the at least one overlaid original frame are opposite to each other, and directly move the at least one overlaid original frame and the at least one first frame under the at least one overlaid original frame upward to fill the at least one emptied grid in response to determining the upper row and the lower row are opposite to each other.

12. A non-transitory recording medium storing a computer program, loaded into an electronic apparatus to execute following steps:
  displaying an item-based page comprising one or more items representing one or more applications on a touch screen;
  detecting a touch operation performed on an item by using the touch screen;
  dragging the item according to the touch operation and displaying an action area of the item-based page on an edge of the touch screen while the item is dragged;
  determining whether the item is dragged to the action area of the item-based page and overlays the action area for a predetermined time;
  in response to determining the item is dragged to the action area of the item-based page and overlays the action area for the predetermined time, turning the item into a frame and switching the item-based page to the frame-based page for allowing a user to move the frame to a desired location within the frame-based page, wherein the frame displays a content of the application represented by the item, the frame-based page comprises a plurality of specific frames and the specific frames do not overlap with each other, and the item-based page comprises no frame;
  determining whether the frame overlays an original frame in the frame-based page;
  moving the original frame in the frame-based page in response to determining the frame overlays the original frame in the frame-based page;
  inserting the frame into the frame-based page in response to the touch operation being released: and
  rearranging the at least one overlaid original frame and at least one first frame under the at least one overlaid original frame to fill at least one grid emptied by moving the at least one overlaid original frame and the at least one first frame under the at least one overlaid original frame downward, wherein the rearranging comprises:
  determining whether a first row containing the at least one overlaid original frame and a second row containing at least one second frame are opposite to each other and have complementary shapes, and
  directly moving the at least one overlaid original frame and the at least one first frame under the at least one overlaid original frame to fill the at least one emptied grid in response to determining the first row and the second row are opposite to each other and have complementary shapes.

* * * * *